United States Patent [19]

Tappe et al.

[11] Patent Number: 4,948,879
[45] Date of Patent: Aug. 14, 1990

[54] MONOAZO COMPOUNDS CONTAINING A FIBER-REACTIVE GROUP AND AN OXAZOLOPYRIDONE OR OXAZINOPYRIDONE COUPLING COMPONENT

[75] Inventors: Horst Tappe, Dietzenbach; Dieter Oehme, Flörsheim am Main; Werner H. Russ, Hofheim am Taunus, all of Fed. Rep. of Germany

[73] Assignee: Hoechst Aktiengesellschaft, Frankfurt am Main, Fed. Rep. of Germany

[21] Appl. No.: 272,781

[22] Filed: Nov. 17, 1988

[30] Foreign Application Priority Data

Nov. 20, 1987 [DE] Fed. Rep. of Germany ....... 3739349

[51] Int. Cl.$^5$ .............. C09B 62/028; C09B 62/45; D06P 1/382; D06P 1/384
[52] U.S. Cl. ............................. 534/642; 534/635; 534/638; 534/641; 534/644; 534/582; 546/116
[58] Field of Search ............... 534/642, 644, 635, 638, 534/641, 617

[56] References Cited

U.S. PATENT DOCUMENTS

| | | | |
|---|---|---|---|
| 4,504,273 | 3/1985 | Begrich et al. | 534/635 |
| 4,585,460 | 4/1986 | Schwander et al. | 534/642 X |
| 4,644,058 | 2/1987 | Shimidzu et al. | 534/642 X |
| 4,659,807 | 4/1987 | Segal | 534/642 |

FOREIGN PATENT DOCUMENTS

| | | | |
|---|---|---|---|
| 0078024 | 9/1984 | European Pat. Off. | 534/642 |
| 0181585 | 5/1986 | European Pat. Off. | 534/642 |
| 1271226 | 4/1972 | United Kingdom | 534/638 |
| 2010882 | 3/1982 | United Kingdom | 534/642 |

OTHER PUBLICATIONS

Tilak et al., *Chemistry and Industry* (London), 29–31, (1981).

Primary Examiner—Floyd D. Higel
Assistant Examiner—Fiona T. Powers

[57] ABSTRACT

Monoazo compounds conforming to the general formula (1) shown and defined hereinafter have very good fiber-reactive dye properties and dye hydroxy- and/or carboxamido-containing material, in particular fiber material, such as wool and in particular cellulose fibers, in strong fast shades.

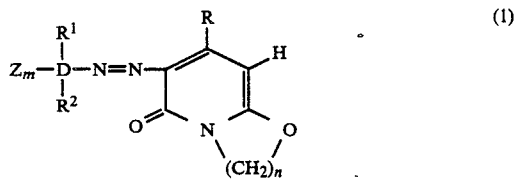

where the symbols have the following meanings:
D is a benzene or naphthalene ring or a heterocyclic radical,
$R^1$ and $R^2$ are each independently of the other hydrogen, alkyl of 1 to 4 carbon atoms, alkoxy of 1 to 4 carbon atoms, halogen, carboxy or sulfo,
Z is a fiber-reactive grouping bonded to D either directly or via a bridge member,
m stands for the number 1 or 2, preferably 1,
R is alkyl of 1 to 4 carbon atoms which may be substituted for example by halogen, such as bromine and in particular chlorine, hydroxy, cyano, sulfo, carboxy, sulfato or phosphato, or is phenyl which may be substituted, for example by 1 or 2 substituents from the group consisting of methyl, ethyl, methoxy, ethoxy, chlorine, sulfo and carboxy, or is carboxy, carbamoyl or carbalkoxy of 2 to 5 carbon atoms,
n stands for the number 2 or 3.

17 Claims, No Drawings

MONOAZO COMPOUNDS CONTAINING A FIBER-REACTIVE GROUP AND AN OXAZOLOPYRIDONE OR OXAZINOPYRIDONE COUPLING COMPONENT

DESCRIPTION

The present invention relates to fiber-reactive dyes.

Fiber-reactive water-soluble azo compounds having dye properties and possessing a 2-hydroxypyridone coupling component have already been described in the literature, for example in U.S. Pat. No. 4,504,273, in European Patent Applications Nos. 0,080,352A, 0,078,024A and 0,107,614A and in British Patents Nos. 1,271,226 and 2,010,882. The azo dyes described in these publications in terms of examples are these days considered to have disadvantages for industrial utilization, whether on account of their molecular structure, which necessitates an expensive synthesis, or whether on account of the properties which no longer meet present-day requirements. Furthermore, fiber-reactive azo compounds having a 2-hydroxypyridone coupling component are known from European Patent Publication No. 0,181,585A and U.S. Pat. No. 4,659,807.

The present invention now provides novel, useful monoazo compounds which conform to the general formula (1)

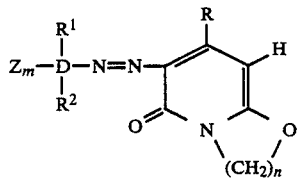

where the symbols have the following meanings:

D is a benzene or naphthalene ring or is a heterocyclic radical, such as a benzothiazol-2-yl radical, where the substituents Z, $R^1$ and $R^2$ are bonded to the carbocyclic moiety, $R^1$ and $R^2$ are each, independently of the other, hydrogen, alkyl of 1 to 4 carbon atoms, such as ethyl and in particular methyl, alkoxy of 1 to 4 carbon atoms, such as ethoxy and in particular methoxy, halogen, such as fluorine and in particular bromine and chlorine, carboxy or sulfo, Z is a fiber-reactive grouping which is bonded to D either directly or via a bridge member, such as a substituted or unsubstituted benzene or naphthalene ring or a substituted or unsubstituted phenylamino or benzoylamino group or an alkylene group of 1 to 4 carbon atoms, m stands for the number 1 or 2, preferably 1, R is an alkyl group of 1 to 4 carbon atoms which may be substituted, for example by halogen, such as bromine and in particular chlorine, hydroxy, cyano, sulfo, carboxy, sulfato or phosphato, or is phenyl which may be substituted, for example by 1 or 2 substituents from the group consisting of methyl, ethyl, methoxy, ethoxy, chlorine, sulfo and carboxy, or is carboxy, carbamoyl or carbalkoxy of 2 to 5 carbon atoms, but preferably alkyl of 1 to 4 carbon atoms, n stands for the number 2 or 3, preferably 3.

Unsubstituted or substituted alkyl groups R are in particular methyl and ethyl and also β-chloroethyl, β-hydroxyethyl, β-cyanoethyl and sulfomethyl.

Fiber-reactive groups Z are those which have been numerously described in the literature and belong to the reactive radicals not only of the aliphatic but also of the heterocyclic series. Reactive radicals of the aliphatic series are in particular those which derive from groups of the vinyl sulfone series, for example from groups conforming to the general formula (2)

$$X-SO_2-A-  \quad (2)$$

where

X denotes a vinyl group or is an ethyl group which is substituted in the β-position by a substituent eliminable under alkaline conditions to form a vinyl group, for example a β-chloroethyl, β-acetyloxy, β-thiosulfatoethyl, β-phosphatoethyl and in particular a β-sulfatoethyl group, and A is a direct bond or a methylene or ethylene group or an amino group of the formula (2a)

(2a)

where R* stands for hydrogen or alkyl of 1 to 4 carbon atoms, such as ethyl and in particular methyl.

Fiber-reactive groups of the aliphatic series are further for example β-bromoacryloylamino, α,β-dibromopropionylamino, β-(phenylsulfonyl)propionylamino, β-(methylsulfonyl)propionylamino, β-chloropropionylamino, 2,2,3,3-tetrafluorocyclobutane-1-carbonylamino, N-(β-sulfatoethylsulfonyl)-N-methyl-or -N-ethyl-amino and N-(vinylsulfonyl)-N-methyl-or -N-ethyl-amino.

Fiber-reactive heterocyclic groups are for example those which are described in German Offenlegungsschrift No. 3,503,746 on pages 9 to 16 and are bonded to D via an amino group of the above formula (2a) directly or via this amino group and a bridge member. Of these, particular preference is given to those heterocyclic reactive radicals which are substituted by halogen, for example 2,6-difluoro-5-chloropyrimidin-4-ylamino, 2-fluoro-5-chloropyrimidin-4-ylamino, 2-fluoro-5-chloro-6-methylpyrimidin-4-ylamino, 2-fluoro-5,6-dichloropyrimidin-4-ylamino and 6-fluoro-2,5-dichloropyrimidin-4-ylamino groups, and in particular to the halotriazine derivatives conforming to a general formula (3)

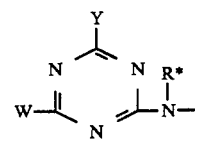

(3)

where

R* has the abovementioned meanings,

Y stands for a fluorine or chlorine atom and

W is a fluorine or chlorine atom or denotes a N-nicotinamide or N-nicotinic acid radical or an amino group of the general formula (4)

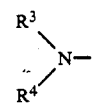

(4)

where

- $R^3$ is a hydrogen atom or an alkyl group of 1 to 4 carbon atoms, such as ethyl or methyl, which may be substituted, for example by 1 or 2 substituents from the group consisting of sulfo, carboxy, phosphato, sulfato, hydroxy, cyano, vinylsulfonyl, β-sulfatoethylsulfonyl, β-chloroethylsulfonyl or substituted or unsubstituted aryl, such as phenyl or naphthyl substituted by 1, 2 or 3, preferably 1 or 2, substituents from the group consisting of sulfo, methyl, ethyl, methoxy, ethoxy, chlorine, bromine, carboxy and a group of the formula $-SO_2-X$ where X has one of the abovementioned meanings, or
- $R^3$ is a cycloaliphatic radical, for example cyclohexyl, and
- $R^4$ is a hydrogen atom or an alkyl group of 1 to 4 carbon atoms, such as ethyl or methyl, which may be substituted, for example by 1 or 2 substituents from the group consisting of sulfo, carboxyl, phosphato, sulfato, hydroxy, cyano, vinylsulfonyl, β-sulfatoethylsulfonyl, β-chloroethylsulfonyl or substituted or unsubstituted aryl, such as phenyl or naphthyl substituted by 1, 2, or 3, preferably 1 or 2, substituents from the group consisting of sulfo, methyl, ethyl, methoxy, ethoxy, chlorine, bromine, carboxy and a group of the formula $-SO_2-X$ where X has one of the abovementioned meanings, or
- $R^4$ is a substituted or unsubstituted aryl radical, such as phenyl or naphthyl which may be substituted by 1, 2 or 3, preferably 1 or 2, substituents from the group consisting of sulfo, carboxy, chlorine, bromine, methyl, ethyl, methoxy, ethoxy and a group of the formula $-SO_2-X$, where X has one of the abovementioned meanings, or
- $R^3$ and $R^4$ together with the nitrogen atom form the radical of a 5- or 6-membered heterocyclic radical, for example a piperidino, piperazino or morpholino radical.

Radicals conforming to the general formula (4) are for example amino, β-(sulfoethyl)amino, N-methyl-N-(β-sulfoethyl)amino or N,N-bis-[β-(β'-chloroethylsulfonyl)-ethyl]amino or phenylamino groups which may each be substituted by 1 or 2 substituents from the group consisting of methyl, ethyl, methoxy, ethoxy, chlorine, bromine and sulfo and may be additionally substituted on the N-atom by methyl or ethyl, or a phenylamino group which may be substituted on the N-atom by methyl or ethyl and whose phenyl radical is substituted by β-sulfatoethylsulfonyl, vinylsulfonyl or β-phosphatoethylsulfonyl and may additionally be substituted by methyl, ethyl, methoxy, ethoxy, chlorine, bromine or sulfo.

Further preferred fiber-reactive halogen-substituted heterocyclic radicals Z are those of the general formula (5)

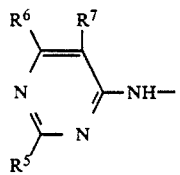

(5)

where
- $R^5$ stands for chlorine, fluorine or methylsulfonyl,
- $R^6$ is chlorine, fluorine or methyl and
- $R^7$ denotes chlorine or cyano.

Hereinbefore and hereinafter, sulfo groups are groups of the general formula $-SO_3M$, carboxy groups conforming to the general formula $-COOM$, sulfato groups are groups conforming to the general formula $-OSO_3M$, thiosulfato groups are groups conforming to the general formula $-S-SO_3M$ and phosphato groups are groups conforming to the general formula $-O-PO_3M_2$, in each of which M stands for a hydrogen atom or an alkali metal, such as sodium, potassium and lithium, or for a salt-forming 2- or 3-valent metal.

Of the azo compounds of the general formula (1) according to the invention, especially commendable ones are those in which R denotes methyl and n stands for the number 3, further those azo compounds in which R and n have the abovementioned meanings, in particular the preferred meanings just mentioned, m stands for the number 1, and Z denotes a group of the general formula $X-SO_2-$ with X having one of the abovementioned meanings, in particular the preferred meaning, and D denotes a benzene ring, and also those conforming to the general formula (1) where R and n have the abovementioned meanings, in particular the preferred meanings just mentioned, D is a naphthalene ring to which the azo group is bonded in the 2-position, m stands for the number 1 or 2, preferably 1, and Z is a fiber-reactive group of the general formula $X-SO_2-$ with X of the abovementioned meanings, in particular the preferred meaning, and $R^1$ and $R^2$ have the abovementioned meanings, but preferably $R^1$ being a hydrogen atom and $R^2$ a hydrogen atom or a sulfo group.

The present invention further provides processes for preparing the compounds of the general formula (1) according to the invention. These processes comprise for example coupling the diazonium compound of an amino compound of the general formula (6)

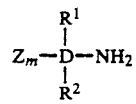

(6)

where Z, m, D, $R^1$ and $R^2$ have the abovementioned meaning, with a compound of the general formula (7)

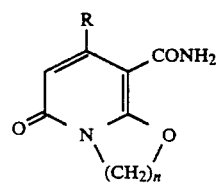

(7)

where R and n have the abovementioned meanings, with simultaneous departure of the carbamoyl group.

Compounds of the general formula (1) whose fiber-reactive radical Z is bonded with its amino group $-N(R^*)-$ to D, in particular a heterocyclic halogen-substituted fiber-reactive radical Z, can according to the invention also be prepared by reacting an amino-azo compound of the general formula (8)

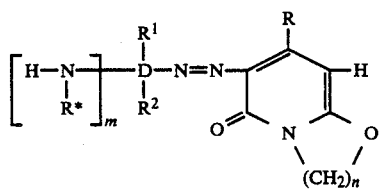

(8)

where D, $R^1$, $R^2$, R, $R^*$, m and n have the abovementioned meanings, m being particularly preferably 1, with a compound of the general formula (9)

$$Z'-Y^1 \qquad (9)$$

where Z' is a radical Z of the abovementioned meaning which is free of the grouping $-N(R^*)-$, and $Y^1$ stands for a substituent detachable as an anion, in particular a halogen atom, such as fluorine or chlorine, in an equivalent amount.

The reaction conditions of the procedures according to the invention are analogous to known procedures of, on the one hand, diazotizing and coupling and, on the other, acylating amino compounds with acylating agents, for example those having reactive halogen atoms, such as fluorine or chlorine atoms, such as heterocyclics containing one or two reactive halogen atoms or compounds having carbonyl chloride or sulfonyl chloride groups. For instance, the diazotization of the amine of the general formula (6) to the diazonium salt is carried out in an aqueous medium by means of a customary nitrosating agent, such as nitrous acid, at a temperature between −5° C. and +20° C. and at a pH of 2 or less than 2; the coupling reaction can be carried out for example in an aqueous medium at a temperature between 5° and 25° C. and at a pH between 2 and 8, preferably between 5 and 7. The reaction according to the invention between an aminoazo compound of the general formula (8) with an acylating agent can be carried out in an aqueous or in an aqueous-organic medium (the organic solvent content being a preferably water-soluble solvent which is inert under the reaction conditions, for example acetone, dimethylformamide or dimethyl sulfoxide) at a pH between 1 and 8, preferably between 4 and 6, and at a temperature between −20° C. and +80° C., preferably between 20° and 60° C.

The starting compounds of the general formula (8) are easily preparable analogously to known procedures by coupling the diazotized amine of the general formula (10)

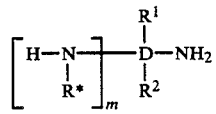

(10)

where D, $R^1$, $R^2$, $R^*$ and m have the abovementioned meanings, m being particularly preferably the number 1, with a coupling component of the abovementioned and above-defined general formula (7) with departure of the carbamoyl group. The amino compounds of the general formula (10) are generally known and numerously described in the literature. Similarly, the starting amino compounds of the general formula (6) containing the fiber-reactive radical Z are known or can be prepared analogously to the known compounds by reacting the corresponding diamino compound of the general formula (10) of the abovementioned meaning with a compound of the abovementioned and above-defined general formula (9) in the manner known and familiar to the person skilled in the art. Such procedures are described in general terms in the literature or in patent publications, for example in European Patent Application Publications Nos. 0,078,009A and 0,212,246A or in the examples of the abovementioned German Offenlegungsschrift No. 3,503,746.

The coupling component of the general formula (7) with R=methyl and n=2 which according to the invention serves as a starting compound is known [see Chem. Ind. (London), 1981, 29–31]. Other starting compounds of the general formula (7) are preparable analogously to the process conditions specified therein. For instance, pyridone compounds of the general formula (13)

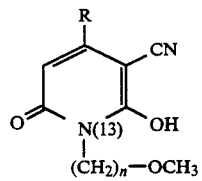

where R and n have the abovementioned meaning (which in turn can be prepared as described in German Offenlegungsschrift No. 3,239,436) are hydrolyzed at the cyano group in 95–98% strength aqueous sulfuric acid at a temperature between 50° and 100° C. to carbamoyl with simultaneous ring formation of the second, fused-on heterocyclic radical. The compound of the general formula (7) obtained can subsequently be isolated from the sulfuric acid solution by precipitation in an ice/water mixture and filtration.

A process variant for preparing compounds of the general formula (1) according to the invention where Z stands for a radical of the general formula (3) and m denotes in particular 1, is associated with the abovementioned procedure whereby such an azo compound is prepared by reacting a starting amino-azo compound of the general formula (8) with a compound of the general formula (9) in which Z' is a radical of the general formula (11)

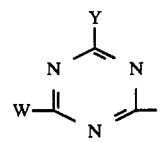

(11)

where W and Y have the abovementioned meanings. This process variant comprises reacting—in a manner analogous to known procedures for reacting dihalotriazine compounds with an amino compound—a compound of the general formula (12)

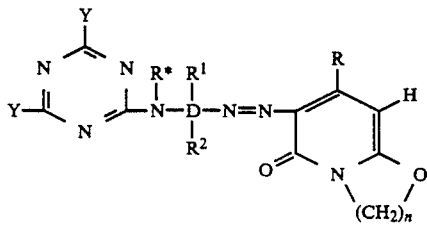

(12)

where R*, R¹, R², R, D and n and also the two Ys have the abovementioned meanings, with an amino compound of the general formula HNR³ and R⁴ with R³ and R⁴ of the abovementioned meanings.

The starting compounds of the general formula (12) themselves are obtained—analogously to the above directions for reacting a compound (8) with a compound (9)—by reacting a compound of the general formula (8) with a trihalo-s-triazine, for example cyanuric fluoride (2,4,6-trifluoro-1,3,5-triazine) or cyanuric chloride (2,4,6-trichloro-1,3,5-triazine). Such procedures and the reaction conditions employed for this purpose are numerously described in the literature (see for example the abovementioned European Patent Application Publications Nos. 0,078,009A and 0,212,264A). For instance, the reaction according to the invention to give compounds of the general formula (1) according to the invention in which Z is a dihalotriazinylamino radical can preferably be effected at a temperature between −10° C. and +40° C., preferably between 0° C. and 30° C., and at a pH between 1.0 and 7.0, preferably between 3.5 and 5, in which case the reaction can be carried out in an aqueous or aqueousorganic medium of the abovementioned type. Similarly, the conversion according to the invention of a compound of the general formula (1) incorporating the dihalotriazinylamino radical Z into a further compound of the general formula (1) according to the invention where Z is a radical of the general formula (3) with W denoting an amino group R⁴R³N—can be effected with an amino compound of the general formula NHR³R⁴ analogously to the state of the art at a temperature between 10° and 60° C., preferably between 20° and 50° C., and at a pH between 2 and 8, preferably between 5 and 7, and in an aqueous or aqueousorganic medium of the above-described kind.

Of the coupling components of the general formula (7) used according to the invention, especially commendable are in particular those whose radicals in the formula (7) have the following meanings:

R is methyl and n is the number 3;
R is methyl and n is the number 2;
R is ethyl and n is the number 3;
R is ethyl and n is the number 2;
R is n-propyl and n is the number 3;
R is n-butyl and n is the number 3;
R is phenyl and n is the number 3.

The starting compounds of the general formula (6) used according to the invention are for example: 4-(β-sulfatoethylsulfonyl)aniline, 2-sulfo-4-(β-sulfatoethylsulfonyl)aniline, 2-chloro-4-(β-sulfatoethylsulfonyl)aniline, 2-bromo-4-(β-sulfatoethylsulfonyl)aniline, 2-methoxy-4-(β-sulfatoethylsulfonyl)aniline, 3-(β-sulfatoethylsulfonyl)aniline, 2-methoxy-5-(β-sulfatoethylsulfonyl)aniline, 2-sulfo-5-(β-sulfatoethylsulfonyl)aniline, 2-chloro-5-(β-sulfatoethylsulfonyl)aniline, 2-bromo-5-(β-sulfatoethylsulfonyl)aniline, 2-sulfo-5-(2',4'-dichloro-s-triazin-6-yl)aminoaniline, 2-sulfo-5-(2'-chloro-4'-amino-s-triazin-6-yl)aminoaniline, 2-sulfo-5-(2'-chloro-4'-methoxy-s-triazin-6-yl)aminoaniline, 2-sulfo-5-[2'-fluoro-4'-(3"-sulfophenyl)amino-s-triazin-6-yl]aminoaniline, 2-sulfo-5-[2'-fluoro-4'-(4"-β"-sulfatoethylsulfonyl)amino-s-triazin-6-yl]aminoaniline, 2-sulfo-5-[2'-chloro-4'-(3"-β"-sulfatoethylsulfonyl)amino-s-triazin-6-yl]amino-aniline, 1-amino-3-N-[3'-(β'-sulfatoethylsulfonyl)phenyl]carboxamide, 6-(β-sulfatoethylsulfonyl)-2-aminonaphthalene, 1-sulfo-6-(β-sulfatoethylsulfonyl)-2-aminonaphthalene, 6-sulfato-8-(β-sulfatoethylsulfonyl)-2-aminonaphthalene, 8-sulfato-6-(β-sulfatoethylsulfonyl)-2-aminonaphthalene.

The compounds of the general formula (1) prepared according to the invention can be precipitated or isolated from the synthesis solutions by generally known methods, for example either by precipitating from the reaction medium by means of electrolytes, for example sodium chloride or potassium chloride, or by evaporating the reaction solution, for example by spray drying, in which case a buffer substance can be added to this reaction solution.

The compounds of the general formula (1) according to the invention—hereinafter referred to as compound (1)—have fiber-reactive properties and possess very good dye properties. They can therefore be used for dyeing (including printing) hydroxy containing and/or carboxamido-containing materials. It is also possible to use the solutions obtained in the synthesis of compounds according to the invention, with or without addition of a buffer substance and with or without concentrating, directly in dyeing as liquid formulations.

The present invention therefore also provides the use of compounds (1) for dyeing (including printing) hydroxy-and/or carboxamido-containing materials, or rather processes for their application to these substrates. Preferably the materials are employed in the form of fiber materials, in particular in the form of textile fibers, such as yarns, wound packages and fabrics. The procedure adoped here can be analogous to known procedures in that compound (1) is in dissolved form applied to or incorporated in the substrate and fixed thereon or therein by heating and/or the action of an alkaline agent. Hydroxy-containing materials are those of a natural or synthetic origin, for example cellulose fiber materials or regenerated products thereof, and polyvinyl alcohols, cellulose fiber materials being preferably cotton but other vegetable fibers as well, such as linen, hemp, jute and ramie fibers; regenerated cellulose fibers are for example staple and filament viscose.

Carboxamido-containing materials are for example synthetic and natural polyamides and polyurethanes, in particular in the form of fibers, for example wool and other animal hair, silk, leather, nylon-6,6, nylon-6, nylon-11 and nylon-4.

Compounds (1) can be applied to and fixed on the substrates mentioned, in particular on the fiber materials mentioned, by the application techniques known for water-soluble, in particular for water-soluble fiber-reactive, dyes. Such dyeing and fixing methods are numerously described in the literature.

For instance, dyeing cellulose fibers by the exhaust method from a long liquor using one of a range of acid-binding agents with or without neutral salts, such as sodium chloride or sodium sulfate, gives very good color yields and an excellent color buildup. Dyeing is preferably carried out in an aqueous bath at temperatures between 40° and 105° C., if appropriate at temperatures up to 120° C. under pressure, and in the presence or absence of customary dyeing assistants. A possible procedure comprises introducing the material into the warm bath and gradually heating the latter to the desired dyeing temperature and completing the dyeing process at that temperature. The neutral salts, which accelerate the exhaustion of the dye, can also be added to the bath if desired only after the actual dyeing temperature has been reached.

The padding method likewise produces excellent color yields and a very good color buildup on cellulose fibers, fixing being possible by batching at room temperature or elevated temperatures, for example at up to 60° C., by steaming or by means of dry heat in a conventional manner.

Similarly, customary printing processes for cellulose fibers, which can be carried out in a one-step manner, for example by printing the material with a print paste containing sodium bicarbonate or another acid-binding agent and compound (1) and by subsequent steaming at 100° to 103° C., or in a two-step manner, for example by printing with a neutral or weakly acid print paste containing compound (1) and subsequent fixing either by passing the printed material through a hot electrolyte-containing alkaline bath or by cross-padding with an alkaline, electrolyte-containing padding liquor and subsequent batching or steaming or dry heat treatment of this alkali-pretreated material, give strong prints having well-defined contours and a clear white ground. The outcome depends only little on varying fixing conditions.

The fixing by means of dry heat in accordance with customary thermofixing processes is carried out using hot air at 120° to 200° C. Aside from the customary steam at 100° to 103° C. it is also possible to use superheated steam and high-pressure steam at temperatures up to 160° C.

The acid-binding agents which bring about a fixation of compounds (1) on cellulose fibers are for example water-soluble basic salts of alkali metals and also alkaline earth metals of inorganic or organic acids or compounds which liberate alkali on heating. Suitable are in particular alkali metal hydroxides and alkali metal salts of weak to medium inorganic or organic acids, preferred alkali metal compounds being the sodium and potassium compounds. Such acid-binding agents are for example sodium hydroxide, potassium hydroxide, sodium carbonate, sodium bicarbonate, potassium carbonate, sodium formate, sodium hydrogenphosphate, disodium hydrogenphosphate, sodium trichloroacetate, sodium silicate or trisodium phosphate.

By treating compounds (1) with acid-binding agents, with or without heating, the former become chemically bonded to the cellulose fiber; the dyeings thus obtained show excellent wet fastness properties following the customary aftertreatment by rinsing for removing unfixed portions of dyes of the formula (1) according to the invention, in particular since unfixed portions are easy to wash off on account of their good solubility in cold water.

Dyeings of polyurethane fibers or natural or synthetic polyamide fibers are customarily carried out in an acid medium. For instance, the dyebath can be admixed with acetic acid and/or ammonium sulfate and/or acetic acid and ammonium acetate or sodium acetate in order to obtain the desired pH. For the purpose of obtaining a dyeing of usable levelness, it is advisable to add customary leveling assistants, for example an assistant based on a reaction product of cyanuric chloride with 3 times the molar amount of an aminobenzenesulfonic acid and/or an aminonaphthalenesulfonic acid or based on a reaction product of for example stearylamine with ethylene oxide. In general, the material to be dyed is introduced into the bath at a temperature of about 40° C. and agitated therein for some time, the dyebath is then brought to the desired weakly acid, preferably weakly acetic acid, pH, and the actual dyeing is carried out at a temperature between 60° and 98° C. Furthermore, the dyeings can also be carried out at the boil or at temperatures up to 120° C. (under pressure).

The dyeings and prints produced using compounds (1) are generally notable for bright greenish to reddish yellow to yellowish orange shades and high tinctorial strengths. The dyeings and prints, in particular those on cellulose fiber materials, have a good light fastness and good wet fastness properties, for example good wash, milling, water, seawater, alkaline and acid cross-dyeing and perspiration fastness properties, and also good fastnesses to pleating and dry heat setting, hot pressing and crocking.

Also of importance is the use of compounds (1) according to the invention for the fiber-reactive dyeing of wool. In particular wool with a non-felting or low-felting finish (cf. for example H. Rath, Lehrbuch der Textilchemie, Springer-Verlag, 3rd edition (1972), pages 295–299, in particular the Hercosett finish (page 298); J. Soc. Dyers and Colourists 1972, 93–99, and 1975, 33–44) is dyeable to a very high fastness level.

Wool is dyed in a conventional and known manner by subjecting the fiber-reactive compound (1) to an exhaustion process under pH control, preferably at the beginning from an acid dyebath at a pH of about 3.5 to 5.5, and toward the end of the dyeing time shifting the pH into the neutral or weakly alkaline range up to a pH of 8.5 in order to bring about the full reactive bond between compound (1) and the fiber, in particular if deep shades are to be obtained. At the same time, the nonreactively bonded dye portion is dissolved off.

The procedure described here is also applicable for producing dyeings on fiber materials made of other natural polyamides or made of synthetic polyamides and polyurethanes. The dyeings are carried out at temperatures of 60° to 100° C., but in sealed dyeing machines they can also be carried out at temperatures of up to 106° C. Since the water-solubility of compounds (1) is very good, they are also usable with advantage in customary continuous dyeing methods. The tinctorial strength of compounds (1) according to the invention is very high. On fiber materials, in particular in the reactive dyeing of wool, they produce bright greenish to reddish yellow to yellowish orange dyeings. On employing dyeing temperatures of 100° to 106° C. the exhaustion of the dyebath is found to be high.

In the case of dyeings obtainable with the compounds (1) according to the invention, it is possible to dispense with an otherwise customary ammoniacal aftertreatment of the dyed material. Compared with structurally similar known dyes they surprisingly show a very good color buildup, the brilliant shade being retained even in very strong dyeings. Moreover, they are highly compatible with other fiber-reactive wool dyes which make possible a surprisingly level dyeing of the fiber. Similarly, material made of wool fibers from different proveniences can be dyed level with the compounds according to the invention. To improve the leveling behavior it is possible, if necessary, to add a customary leveling assistant, for example N-methyltaurine.

Used in the presence of customary dyeing assistants having an affinity for wool the compounds according to the invention produce level dyeings even on wool which has been given a non-felting or low-felting finish. At pale to medium depths of shade a high wet fastness level is obtainable even without an ammoniacal aftertreatment, although in certain circumstances an ammoniacal aftertreatment can be preferable. Aside from their high light fastness, these wool dyeings are also notable for good wet fastness properties, in particular the perspiration fastness properties and the wash fastness at 60° C., even of dyeings to high depths of shade.

The Exaples below serve to illustrate the invention. Parts and percentages are by weight, unless otherwise stated. Parts by weight bear the same relation to parts by volume as the kilogram to the liter.

The compounds described below in the Examples in terms of formulae are shown in the form of the free acids; in general, they are prepared and isolated in the form of their sodium or potassium salts and are used for dyeing in the form of their salts. It is similarly possible to use in the synthesis the starting compounds and components mentioned in the form of the free acid in the Examples below, in particular the Table Examples, as such or in the form of their salts, preferably alkali metal salts, such as sodium or potassium salts.

The absorption maxima ($\lambda_{max}$ values) in the visible region mentioned in the Examples for the azo compounds (1) according to the invention were determined on the alkali metal salts thereof in aqueous solution.

EXAMPLE A 88 parts of 1-(γ-methoxy-n-propyl)-2-hydroxy-3-cyano-4-methylpyrid-6-one (see Example 1 of German Offenlegungsschrift No. 3,239,436) are stirred without cooling at 25° to 60° C. into 293 parts of 25% strength aqueous sulfuric acid. The reaction mixture is heated to 80° C., stirred at 80° C. for 2 hours, cooled down to 25° C. and poured with stirring onto a mixture of 100 parts of water and 540 parts of ice, this mixture is brought to pH 6 by means of about 660 parts of a 30 to 33% strength aqueous sodium hydroxide solution and filtered, and the residue is dried.

78 parts are obtained of the compound of the formula

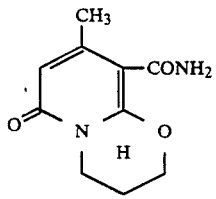

bearing the chemical name 8-methyl-6-oxo-3,4-dihydro-2H,6H-pyrido[2,1-b] [1,3]oxazine-9-carboxamide as a white powder having a melting point of 229° C.

EXAMPLE B

The coupling component bearing the chemical name 6-carbamoyl-2,3-dihydro-7-methyloxazolo[3,2-a]pyrid-5(4H)-one can be prepared by the procedure of Example A from 1-(β-methoxyethyl)-2-hydroxy-3-cyano-4-methylpyrid-6-one with demethylating ring closure and simultaneous hydrolysis of the cyano group to a carbamoyl group by means of aqueous sulfuric acid (the 2-hydroxypyrid-6-one starting compound itself is obtained by the method of Example 1 of German Offenlegungsschrift No. 3,239,436, except that the N-[(γ-methoxy)propyl]cyanoacetamide used therein is replaced by N-[(β-methoxy)ethyl]cyanoacetamide); it is obtained as a white powder having a melting point of 238° C. and has the formula

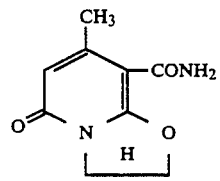

EXAMPLE 1

29.1 parts of 3-(β-sulfatoethylsulfonyl)aniline are diazotized in a conventional manner at 0° to 7° C. in an aqueous hydrochloric acid solution (200 parts of water and 27.6 parts of 31% strength aqueous hydrochloric acid) by stirring into the solution an aqueous solution containing 7 parts of sodium nitrite. The solution is then brought to pH 6 with sodium bicarbonate; 20.8 parts of the pyridone compound of Example A are added, and the coupling is carried out at a pH of 6 to 7 and at a temperature of 15° to 20° C. in the course of 5 hours. The solution is then admixed with 1 part of kieselguhr and filtered, and the filtrate is evaporated to dryness.

The monoazo compound according to the invention is obtained as the sodium salt of the formula

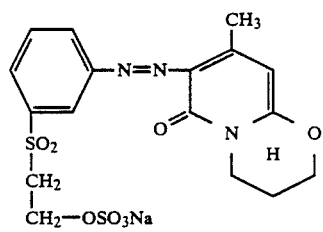

($\lambda_{max}$ = 413 nm)

in the form of a product containing electrolyte salt (sodium chloride). It has very good fiber-reactive dyeing properties and, applied to the materials mentioned in the description, in particular cellulose fiber materials, for example cotton, by the application and fixing methods customary in the art, in particular for fiber-reactive dyes, produces strong greenish yellow dyeings and prints of good light fastness and good wet fastness properties, in particular good wash, milling, cross-dyeing, chlorinated water and perspiration fastness properties.

EXAMPLE 2

To prepare a monoazo compound according to the invention, the procedure of Example 1 is followed, except that the diazo component used in place of the aniline compound used therein is 2-methoxy-5-(β-sulfatoethylsulfonyl)-aniline in an amount of 130.2 parts. The monoazo compound according to the invention of the formula

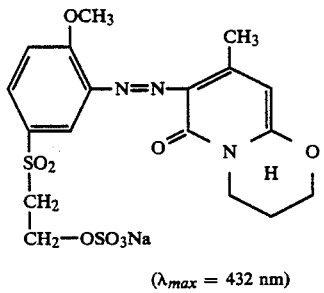

($\lambda_{max}$ = 432 nm)

is obtained as a yellow powder containing electrolyte salts. The azo compound according to the invention likewise has very good fiber-reactive dye properties and, applied by the application and fixing methods customary for fiber-reactive dyes, produces in particular on cellulose fiber materials, such as cotton, strong greenish yellow dyeings and prints of good light and wet fastness properties, such as good wash, milling, cross-dyeing and perspiration fastness properties.

EXAMPLE 3

To prepare a monoazo component according to the invention, the procedure of Example 1 is followed, except that the pyridone coupling component used therein is replaced by the pyridon compound of Example B used in an amount of 19.4 parts. The monoazo component according to the invention of the formula

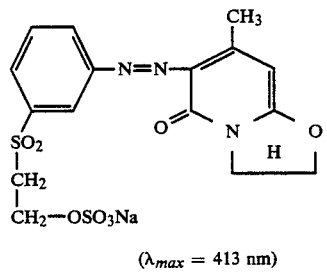

($\lambda_{max}$ = 413 nm)

is obtained as a yellow powder containing electrolyte salt. The azo compound according to the invention likewise has very good fiber-reactive dye properties and, applied by the application and fixing methods customary for fiber-reactive dyes, produces in particular on cellulose fiber material, such as cotton, strong greenish yellow dyeings and prints of good light and wet fastness properties, such as good wash, milling, cross-dying and perspiration fastness properties.

EXAMPLES 4 TO 7

The Table Examples below describe further monoazo compounds of the general formula (1) according to the invention in terms of their diazo and coupling components. They are preparable in a manner according to the invention, for example by the above Working Examples, by means of the components evident from the particular Table Example. They possess very good fiber-reactive dye properties and, applied by the application and fixing methods customary for fiber-reactive dyes, produce on the materials mentioned in the description, in particular on cellulose fiber materials, strong fast dyeings and prints in the hue indicated in the particular Table Example for dyeings on cotton. The numbers given in brackets indicate the absorption maximum in nm.

| | Monoazo compound of the formula (1) | | |
|---|---|---|---|
| Ex. | Diazo component | Coupling component | Hue |
| 4 | 2-methoxy-4-(β-sulfatoethylsulfonyl)aniline | of Example A | yellow (435) |
| 5 | 6-(β-sulfatoethylsulfonyl)-8-sulfo-2-aminonaphthalene | of Example A | yellow (435) |
| 6 | 2-sulfo-5-(β-sulfatoethylsulfonyl)-aniline | of Example A | greenish yellow (410) |
| 7 | 4-chloro-3-(β-sulfatoethylsulfonyl)-aniline | of Example A | greenish yellow (416) |

APPLICATION EXAMPLE 1

20 parts of the monoazo compound of Example 1 according to the invention are dissolved in 300 parts of water together with 50 parts of urea. The solution is stirred at below 40° C. into 400 parts of a neutral aqueous 4% strength alginate thickening. 10 parts of sodium carbonate are added, and sufficient 4% strength aqueous alginate thickening is added to make up to a total amount of 1000 parts. This is followed by thorough stirring, and the print paste thus produced is used to print a cotton fabric which, after drying at 60° C., is treated in a commercially available steaming unit with saturated steam at 100° to 103° C. for 5 minutes. The print thus produced is then finished by rinsing with cold and hot water, washing with a neutral detergent and further rinsing with water. After the fabric has been dried, it shows a strong greenish yellow print having the good fastness properties mentioned in Example 1.

APPLICATION EXAMPLE 2

A fabric made of mercerized cotton is padded with an aqueous dyeing liquor at 20° C. containing per liter 20 g of the azo compound of Example 1 according to the invention and 18 g of 33% strength sodium hydroxide solution to a wet pickup of 70%, based on the weight of the fabric. The padded fabric is wound onto a batching roller, wrapped in plastic sheeting and left at room temperature for 8 hours. It is then finished by rinsing with cold water, treating with an aqueous bath containing a little acetic acid and further rinsing in cold and hot water. After drying it shows a strong greenish yellow dyeing having the good fastness properties mentioned in Example 1.

APPLICATION EXAMPLE 3

100 parts of a fabric made of mercerized cotton are treated for 10 minutes at 60° C. in 3000 parts of volume of an aqueous dyebath containing 5 parts of the azo compound of Example 1 according to the invention and 150 parts of anhydrous sodium sulfate. After this 10-minute treatment, 15 parts of anhydrous sodium carbonate and 4 parts of 33% strength sodium hydroxide solution are added, and the dyeing is continued at 60° C. for 60 minutes. The dyed fabric is then finished in a conventional manner, for example as in Application Example 2. The result obtained is a strong greenish yellow dyeing having the good fastness properties mentioned in Example 1.

APPLICATION EXAMPLE 4

100 parts of a wool fabric are introduced into a hot aqueous dyebath at 40° C. comprising 3000 parts of water, 2 parts of the monoazo compound according to the invention described in Example 1, 0.15 part of an addition product of 12 moles of ethylene oxide on 1 mole of stearylamine, 2 parts of ammonium acetate and 2 parts of 60% strength aqueous acetic acid. The dyeing temperature is raised to the boil in the course of 30 minutes, and the dyeing is then continued at 100° C. for 60 minutes. Following conventional washing off and finishing this wool fabric shows a strong greenish yellow shade of very good light fastness and very good wet fastness properties.

APPLICATION EXAMPLE 5

Application Example 4 is repeated, except that the wool fabric is replaced by 100 parts of a fabric made of an ξ-polycaprolactam fiber, likewise affording a strong greenish yellow dyeing having good end-use fastness properties.

By following the above Application Examples it is also possible to use the other monoazo compounds given in the Working and Table Examples in dyeing and printing, likewise obtaining very strong dyeings and prints of good light and wet fastness properties in the hues specified for the respective Working or Table Example.

We claim:

1. A monoazo compound conforming to the formula

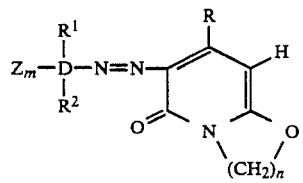

wherein:

D is a benzene or naphthalene ring or benzothiazol-2-yl, $R^1$ and $R^2$ are each, independently of the other, hydrogen, alkyl of 1 to 4 carbon atoms, alkoxy of 1 to 4 carbon atoms, halogen, carboxy or sulfo, Z is a group of the formula (2)

$$X-SO_2-A- \qquad (2)$$

in which

X is vinyl, or is ethyl substituted in the β-position by a substituent eliminable under alkaline conditions to form a vinyl group, and A is a direct bond, methylene, ethylene or a group of the formula (2a)

 (2a)

where

R* is hydrogen or alkyl or 1 to 4 carbon atoms, or

Z is β-bromoacryloylamino, α,β-dibromopropionylamino, β-(phenylsulfonyl)propionylamino, β-(methylsulfonyl)-propionylamino, β-chloropropionylamino, 2,2,3,3-tetrafluorocyclobutane-1-carbonylamino, N-(β-sulfatoethylsulfonyl)-N-methyl- or -N-ethyl-amino, or N-(vinylsulfonyl)-N-methyl- or -N-ethyl-amino or a group of the formula (3)

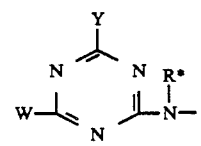 (3)

where

R* has the abovementioned meanings,

Y is fluorine or chlorine and

W is fluorine or chlorine or a N-nicotinamide or N-nicotinic acid group or an amino group of the formula (4)

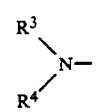 (4)

where $R^3$ is hydrogen, alkyl of 1 to 4 carbon atoms unsubstituted or substituted by 1 or 2 substituents selected from the group consisting of sulfo, carboxy, phosphato, sulfato, hydroxy, cyano, vinylsulfonyl, β-sulfatoethylsulfonyl, β-chloroethylsulfonyl and phenyl or naphthyl each unsubstituted or substituted by 1, 2 or 3 substituents selected from the group consisting of sulfo, carboxy, methyl, ethyl, methoxy, ethoxy, chlorine, bromine and a group of the formula $-SO_2-X$ where X has one of the abovementioned meanings, or $R^3$ is a cycloaliphatic group, and $R^4$ is hydrogen or alkyl of 1 to 4 carbon atoms unsubstituted or substituted by 1 or 2 substituents selected from the group consisting of sulfo, carboxy, phosphato, sulfato, hydroxy, cyano, vinylsulfonyl, β-sulfatoethylsulfonyl, β-chloroethylsulfonyl and phenyl or naphthyl each unsubstituted or substituted by 1, 2, or 3 substituents selected from the group consisting of sulfo, carboxy, methyl, ethyl, methoxy, ethoxy, chlorine, bromine, and a group of the formula $-SO_2-X$ where X has one of the abovementioned meanings, or $R^4$ is phenyl or naphthyl each unsubstituted or substituted by 1, 2 or 3 substituents selected from the group consisting of sulfo, carboxy, chlorine, bromine, methyl, ethyl, methoxy, ethoxy and a group of the formula $-SO_2-X$ where X has one of the abovementioned meanings, or $R^3$ and $R^4$ together with the nitrogen atom form the piperidino, piperazino or morpholino group, or Z is a group of the formula (5)

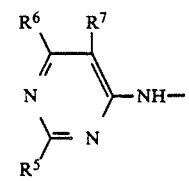 (5)

where $R^5$ is chlorine, fluorine or methylsulfonyl, $R^6$ is chlorine, fluorine or methyl and $R^7$ is chlorine or cyano m is the number 1 or 2, R is hydrogen or alkyl of 1 to 4 carbon atoms unsubstituted or substituted by halogen, hydroxy, cyano, sulfo, carboxy, sulfato or phosphato, or is phenyl unsubstituted or substituted by 1 or 2 substituents selected from the group consisting of methyl, ethyl, methoxy, ethoxy, chlorine, sulfo and carboxy, or is carboxy, carbamoyl or carbalkoxy of 2 to 5 carbon atoms, n is the number 2 or 3.

2. A compound as claimed in claim 1, wherein R is alkyl of 1 to 4 carbon atoms.

3. A compound as claimed in claim 1, wherein R is methyl.

4. A compound as claimed in claim 1, wherein m is 1.

5. A compound as claimed in claim 1, wherein n is 3.

6. A compound as claimed in claim 1, wherein R is methyl, n is 3, m is 1, and Z is a group of the formula X—SO$_2$— wherein X is vinyl or is an ethyl which is substituted in the β-position by a substituent eliminable by an alkali.

7. A compound as claimed in claim 1, wherein m is 1 and Z is a group of the formula X—SO$_2$— wherein X is vinyl or is an ethyl which is substituted in the β-position by a substituent eliminable by an alkali.

8. A compound as claimed in claim 1, wherein D is a naphthalene ring to which the azo group is bonded in the 2-position, $R^1$ and $R^2$ have the meanings mentioned in claim 1, m is 1, Z is a group of the formula X—SO$_2$— wherein X is vinyl or is an ethyl which is substituted in the β-position by a substituent eliminable by an alkali, R is methyl and n is 3.

9. A compound as claimed in claim 8, wherein $R^1$ is hydrogen and $R^2$ is hydrogen or sulfo.

10. A compound as claimed in claim 1, wherein D is a benzene ring, $R^1$ and $R^2$ have the meanings mentioned in claim 1, m is 1, Z is a group of the formula X—SO$_2$— wherein X is vinyl or is an ethyl which is substituted in the β-position by a substituent eliminable by an alkali, R is methyl and n is 3.

11. A compound as claimed in claim 6, wherein X is vinyl, β-thiosulfatoethyl, β-phosphatoethyl, β-chloroethyl or β-sulfatoethyl.

12. A compound as claimed in claim 7, wherein X is vinyl, β-thiosulfatoethyl, β-phosphatoethyl, β-chloroethyl or β-sulfatoethyl.

13. A compound as claimed in claim 8, wherein X is vinyl, β-thiosulfatoethyl, β-phosphatoethyl, β-chloroethyl or β-sulfatoethyl.

14. A compound as claimed in claim 10, wherein X is vinyl, β-thiosulfatoethyl, β-phosphatoethyl, β-chloroethyl or β-sulfatoethyl.

15. A compound as claimed in claim 1, wherein Z is a group of the formula X—SO$_2$— wherein X is vinyl or an ethyl group which is substituted in the β-position by a substituent which is eliminable by the action of alkali.

16. A compound as claimed in claim 15, wherein X is vinyl, β-thiosulfatoethyl, β-phosphatoethyl, β-chloroethyl or β-sulfatoethyl.

17. A compound as claimed in claim 15, wherein X is β-sulfatoethyl.

* * * * *